(12) United States Patent
McFall et al.

(10) Patent No.: US 7,434,662 B2
(45) Date of Patent: Oct. 14, 2008

(54) APPARATUS FOR HUNTING IN TREES

(76) Inventors: Harry G. McFall, 201 N. Ivy St., Elmwood, IL (US) 61529; Curtis Patterson, 2409 N. Quarry Rd., Trivoli, IL (US) 61569

( * ) Notice: Subject to any disclaimer, the term of this patent is extended or adjusted under 35 U.S.C. 154(b) by 462 days.

(21) Appl. No.: 10/993,019

(22) Filed: Nov. 19, 2004

(65) Prior Publication Data

US 2005/0167200 A1 Aug. 4, 2005

Related U.S. Application Data

(60) Provisional application No. 60/523,236, filed on Nov. 19, 2003.

(51) Int. Cl.
*E04G 3/28* (2006.01)
(52) U.S. Cl. ...................... 182/187; 182/133
(58) Field of Classification Search ................. 182/20, 182/113, 116, 133–136, 187, 188; 108/152; 297/217.7
See application file for complete search history.

(56) References Cited

U.S. PATENT DOCUMENTS

| | | | |
|---|---|---|---|
| 2,855,980 A | 10/1958 | Konieczka | 155/78 |
| 2,924,019 A * | 2/1960 | Verner | 33/557 |
| 3,493,080 A | 2/1970 | Ehlert et al. | |
| 4,120,379 A | 10/1978 | Carter | 182/187 |
| 4,549,635 A | 10/1985 | Early | |
| 4,730,699 A | 3/1988 | Threlkeld | |
| 4,819,763 A | 4/1989 | Grote | 182/187 |
| 5,016,733 A * | 5/1991 | Bradley | 182/187 |
| 5,363,941 A | 11/1994 | Richard | 182/187 |
| 5,394,957 A | 3/1995 | Doby | |
| 5,458,215 A | 10/1995 | Burgin | |
| 5,791,436 A | 8/1998 | Talley, Sr. | |
| 5,848,666 A | 12/1998 | Woodall et al. | 182/187 |
| 6,264,000 B1 * | 7/2001 | Johnson | 182/187 |
| 6,386,321 B1 | 5/2002 | Muhich | |

* cited by examiner

*Primary Examiner*—Richard E. Chilcot, Jr.
*Assistant Examiner*—Matthew J Smith
(74) *Attorney, Agent, or Firm*—Golden's M&I; James B. Golden

(57) ABSTRACT

An apparatus and method for hunting in leaning and non-leaning trees is disclosed. The apparatus includes an adjustable tree stand having top and/or bottom adjustment. Adjustment is provided through the use of an adjustment device attached to a support or a cross-member. The apparatus also includes a measuring device for use in measuring tree "lean." The measuring device connects to the bottom of the tree stand. The method includes making a gross adjustment of the tree stand based upon measurement of tree lean using the measuring device.

2 Claims, 8 Drawing Sheets

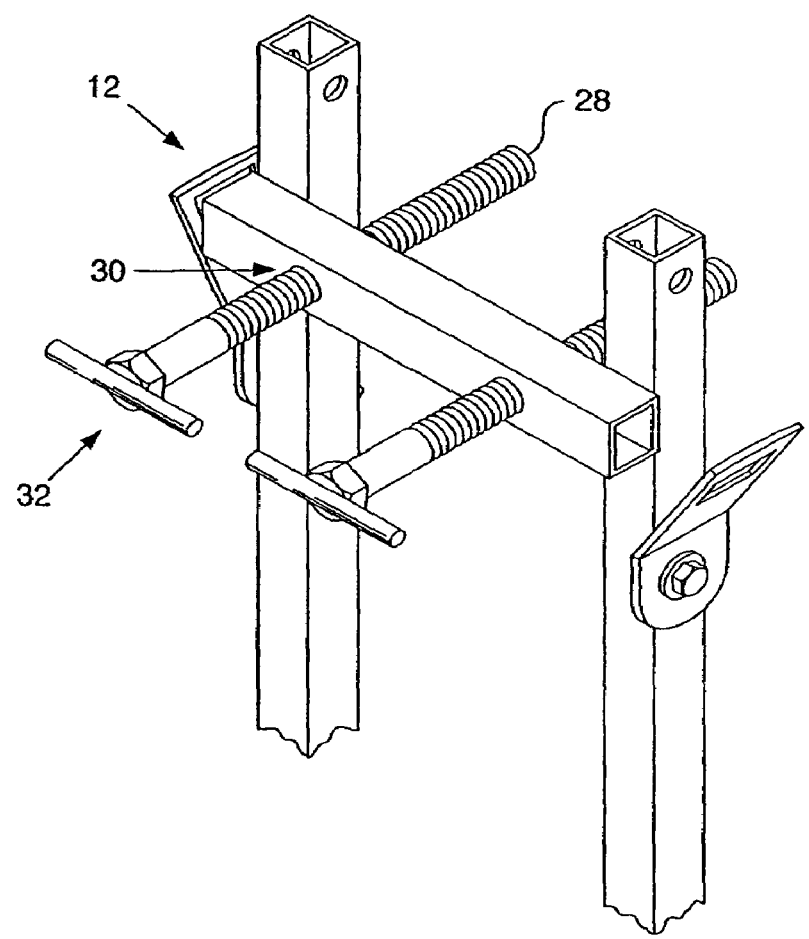

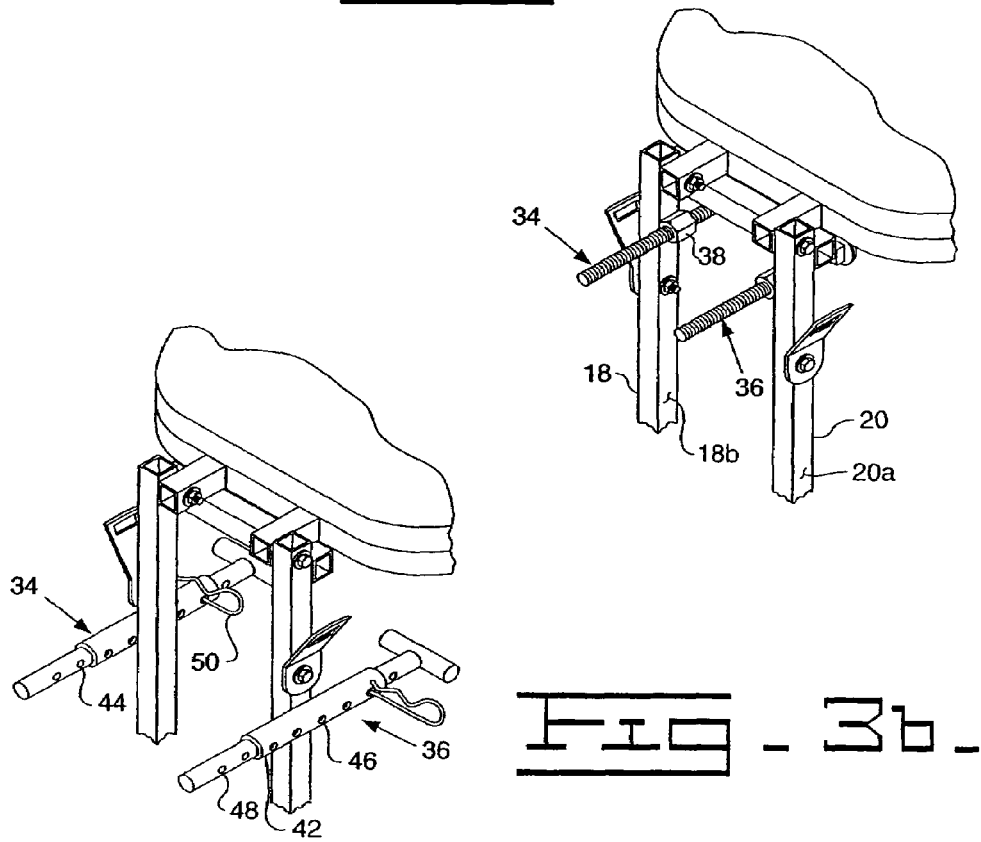
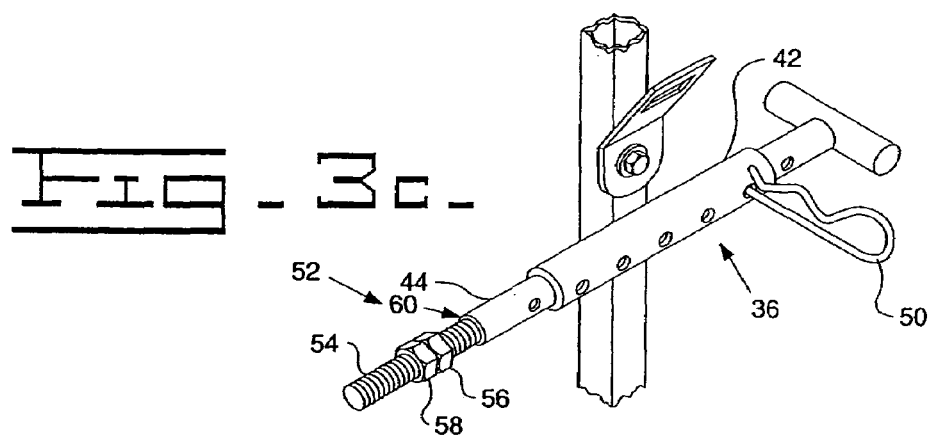

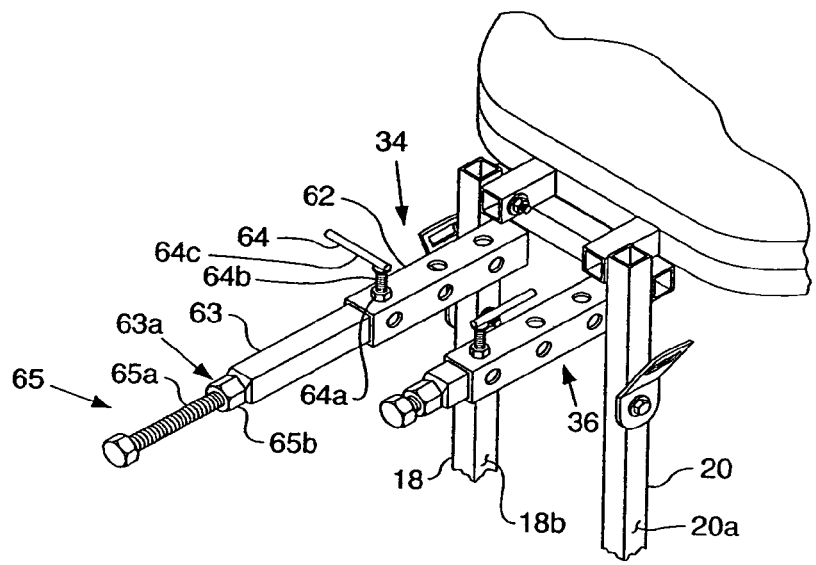
Fig_3d_
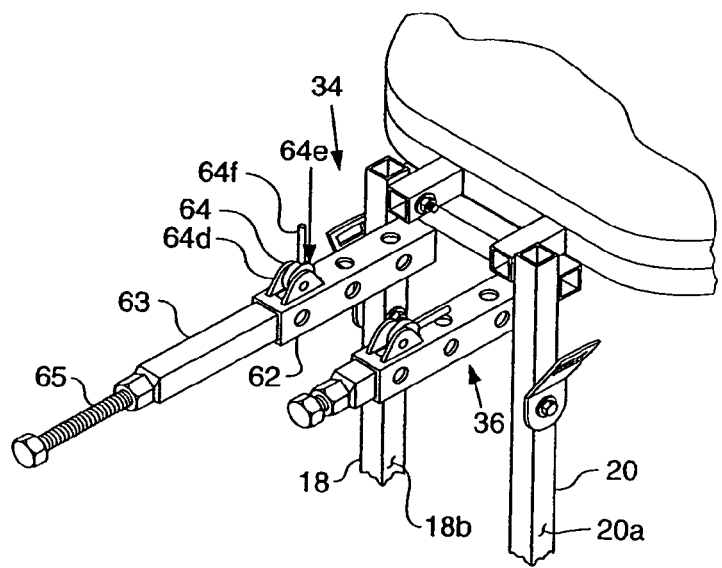
Fig_3e_

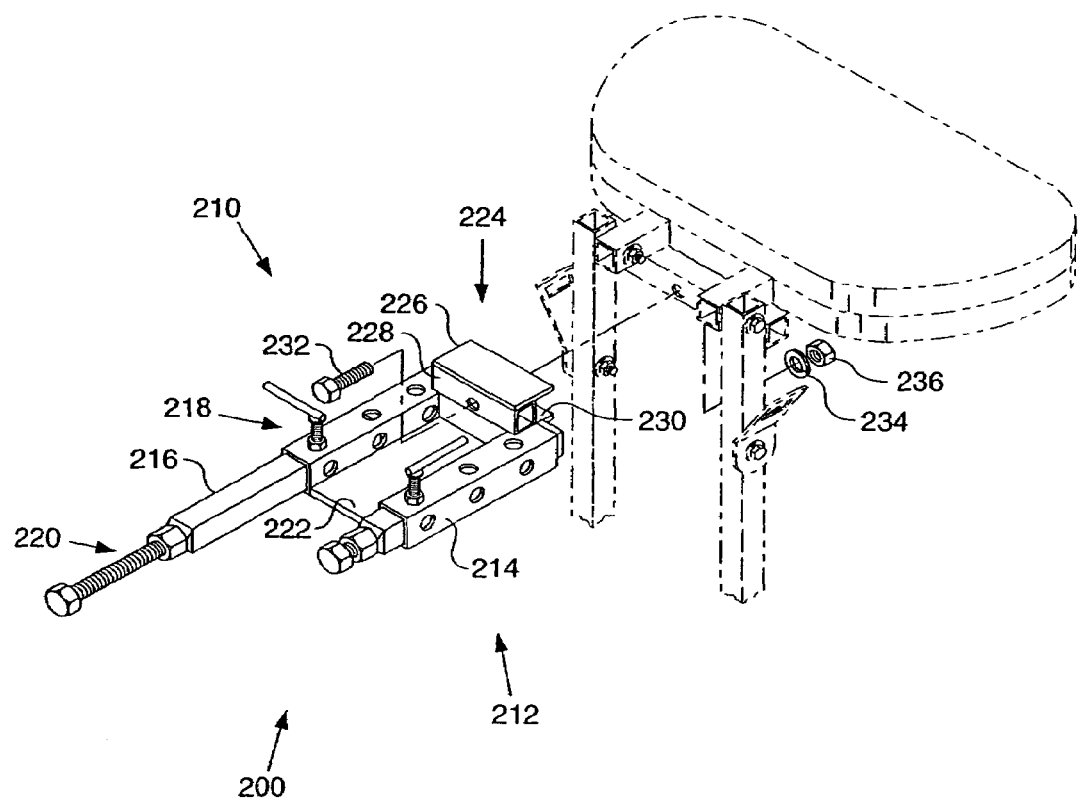
Fig_4_

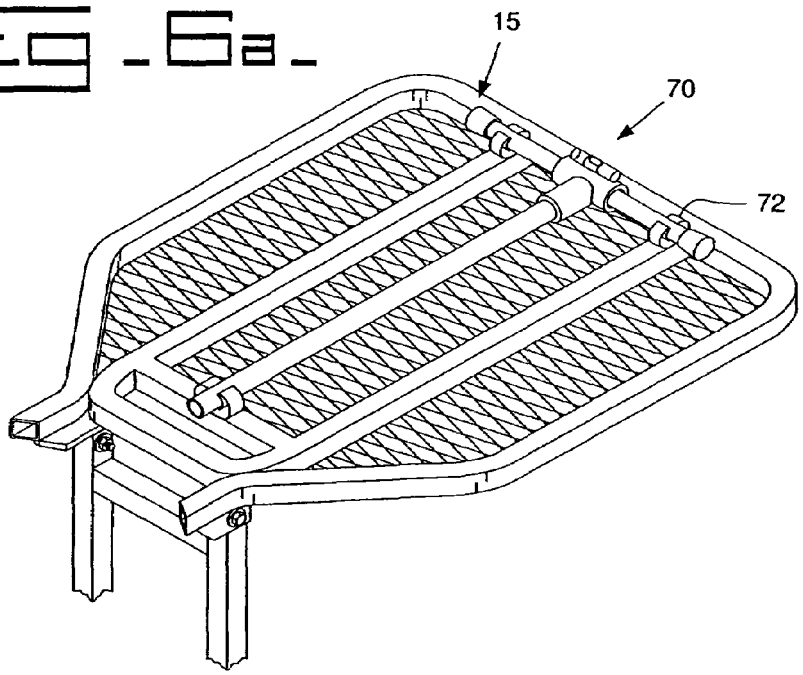
Fig_6a_
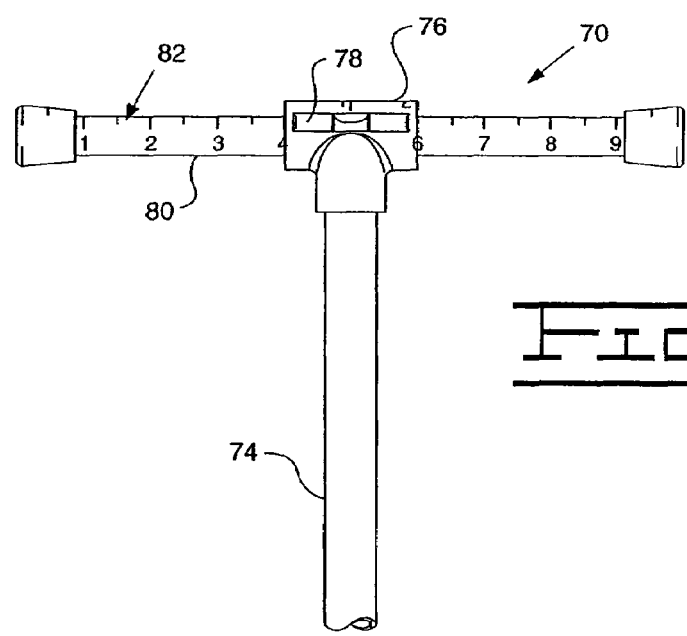
Fig_6b_

APPARATUS FOR HUNTING IN TREES

CROSS-REFERENCE TO RELATED APPLICATIONS

This application claims priority of U.S. Provisional Application No. 60/523,236 filed Nov. 19, 2003.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to a tree stand and, more particularly, to an apparatus and method for hunting in trees.

2. Related Art

Tree stands are load supporting platforms used primarily by hunters. The stands are used to support a hunter at an elevated position on the trunk of a tree. Most conventional tree stands have a foot platform and a seat. Examples of such tree stands are disclosed by U.S. Pat. Nos. 2,855,980, issued to Konieczka on Oct. 14, 1958; 4,120,379, issued to Carter on Oct. 17, 1978; 4,819,763, issued to Grote on Apr. 11, 1989; 5,363,941, issued to Richard on Nov. 15, 1994; and 5,848,666, issued to Woodall et al. on Dec. 15, 1998.

As most hunters know, tree selection for tree stand placement is critical. This is especially true for bow hunters because of the limited effective range of the bow. Finding a perfectly straight tree in a perfect hunting spot, however, rarely can be accomplished. More often than not, trees at ideal locations have a "lean" or angle making them difficult for installation and use of the tree stand.

Installing a standard tree stand in a tree that leans presents one of two major problems for the hunter. Either the tree stand is declined such that the hunter feels that he or she could easily fall out of the tree stand or the tree stand is inclined such that the hunter is at a disadvantageous angle for viewing the ground and/or prey. Either case is unwanted by the hunter and, hence, installing a standard tree stand in a leaning tree is undesirable even if it is in an ideal location.

There remains a need in the art for an apparatus and method for hunting in trees.

SUMMARY OF THE INVENTION

It is in view of the above problems that the present invention was developed. The invention is an apparatus and method for hunting in trees. The apparatus includes an adjustable tree stand for use in leaning and non-leaning trees. The tree stand includes means for adjusting the angle of the tree stand relative to the tree. The adjustable tree stand has top and/or bottom adjustment. Adjustment is provided through the use of an adjustment device attached to a support or a cross-member.

In another aspect of the invention, there is provided a universal adjustment device. The universal adjustment device can be installed on existing tree stands. The universal adjustment device increases the flexibility and functionality of an existing tree stand.

The apparatus also includes a measuring device for use in measuring tree "lean." The measuring device connects to the bottom of the tree stand. The measuring device includes a handle, a level and a sliding member having units of measurement.

The invention also includes a method of gross adjustment of the tree stand upon measurement of tree lean. The measuring device is used by placing the handle against a tree, verifying that the sliding member is level, and measuring the distance to the tree using the sliding member. The user then makes a gross adjustment of the tree stand based upon the distance measurement. In some embodiments, fine adjustment is made after the stand is mounted in the tree Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 is a detailed perspective view of the tree stand in a second embodiment;

FIG. 3a is a detailed perspective view of the tree stand in a third embodiment;

FIG. 3b is a detailed perspective view of the tree stand in a third embodiment;

FIG. 3c is a detailed perspective view of the tree stand in a third embodiment;

FIG. 3d is a detailed perspective view of the tree stand in a third embodiment;

FIG. 3e is a detailed perspective view of the tree stand in a third embodiment;

FIG. 4 is a detailed perspective view of a universal adjustment device for use with a tree stand;

FIG. 6a is a bottom perspective view of the tree stand and a measuring device;

FIG. 6b is a side view of the measuring device; and

DETAILED DESCRIPTION OF THE PREFERRED EMBODIMENT

Figure 1:
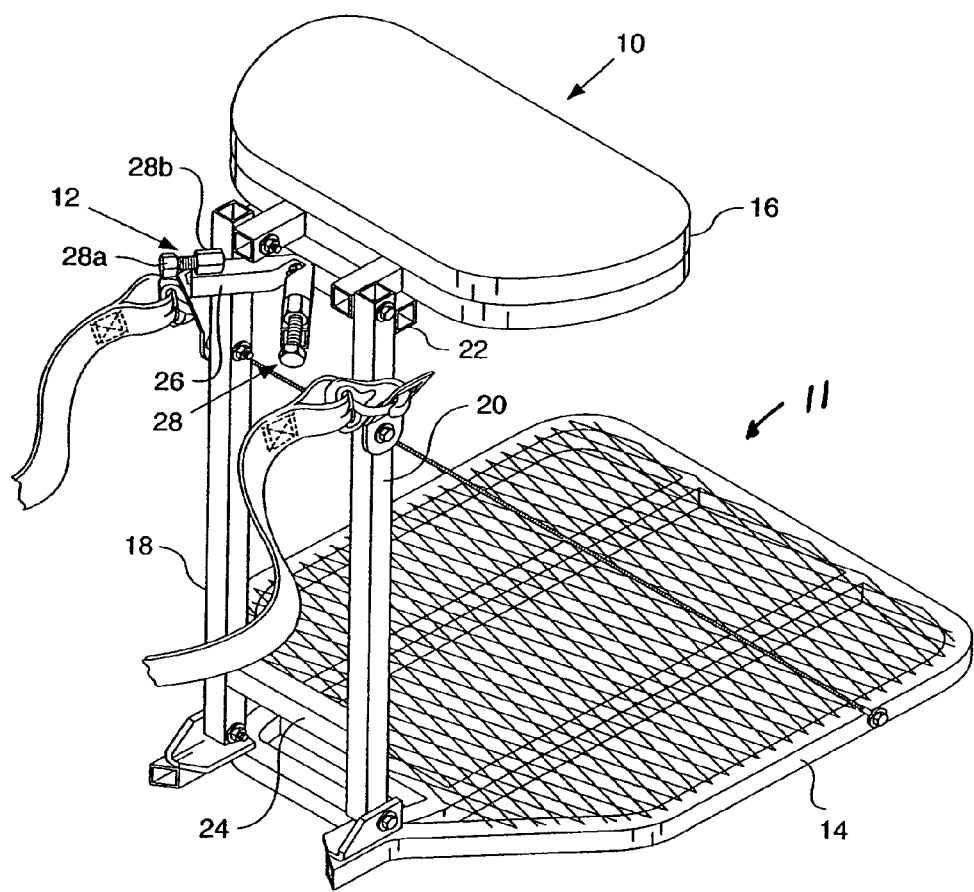
FIG. 1 is a perspective view of a tree stand in a first embodiment.

Referring to the accompanying drawings in which like reference numbers indicate like elements, FIG. 1 illustrates a tree stand assembly 11 comprised of a tree stand 10 and an adjustment device 12. The tree stand 10 includes a platform 14, a seat 16, a first support member 18, and a second support member 20. In the depicted embodiment, the platform 14 and the seat 16 are parallel to one another. The support members 18, 20 are connected by a first cross-member 22 and a second cross-member 24.

In a first embodiment depicted in FIG. 1, the adjusting device 12 is operatively connected to the first cross-member 22. While in the depicted embodiment the adjusting device 12 is shown connected to the first cross-member 22, those skilled in the art will understand that the adjusting device could also be attached to the second cross-member 24 or both of the cross-members 22, 24. The adjusting device 12 includes a V-shaped member 26 and adjustment fingers 28. The V-shaped member has a top 26a, sides 26b, and a bottom (not shown). In the depicted embodiment, the adjustment fingers 28 are operatively connected to the top 26a of the V-shaped member 26; however, the adjustment fingers 28 could also be attached to the sides 26a or the bottom. The adjustment fingers 28 are extendable in length and are independently adjustable relative to one another. In the depicted embodiment, each of the adjustment fingers 28 includes a screw 28a and a nut 28b.

FIG. 2 illustrates a variation of the adjustment device 12 shown in the first embodiment. In the depicted embodiment of FIG. 2, the first cross-member 22 includes first holes 30. While in the depicted embodiment the holes 30 are shown connected to the first cross-member 22, those skilled in the art will understand that the second cross-member 24 or both of the cross-members 22, 24 could include holes. The adjustment fingers 28 are operatively connected to the first holes 30. In the depicted embodiment, the adjustment fingers 28 and the first holes 30 are threaded and operatively engage one another. In an optional embodiment, each of the adjustment fingers 28 includes a handle 32.

FIG. 3a illustrates a third embodiment of the adjusting device 12. In this third embodiment, the adjusting device 12 is operatively connected to the first support 18 and/or second support 20 rather than the cross-members 22, 24. The first support 18 includes an outer side 18a (not shown) and an inner side 18b opposite the outer side 18a. The second support 20 includes an outer side 20a and an inner side 20b (not shown) opposite the outer side 20a. The adjusting device 12 includes a first adjustment finger 34 operatively connected to the first support member 18 and a second adjustment finger 36 operatively connected to the second support member 20. The first and second adjustment screws 34, 36 are operatively connected to the inner sides 18b, 20b of the first and second supports 18, 20 in the depicted embodiment of FIG. 3a. In the depicted embodiment each of the first and second adjustment screws engage a nut 38.

FIG. 3b illustrates a variation of the third embodiment. FIG. 3b depicts the first adjustment finger 34 and the second adjustment finger 36. The first and second adjustment fingers 34, 36 are operatively connected to the outer sides 18a, 20a of the first and second supports 18, 20 in the embodiment depicted in FIG. 3b. In the depicted embodiment each of the first and second adjustment fingers includes a tube 42 and a pin 44. The tube 42 includes second holes 46, and the pin 44 includes third holes 48. A keeper 50, such as a cotter pin, can be placed through the holes 46, 48 when in alignment to fix the overall length of the first and second adjustment fingers 34, 36.

FIG. 3c illustrates a variation of the embodiment shown in FIG. 3b. In FIG. 3c, the first and second adjustment fingers 34, 36 have both a gross and a fine adjustment. As is the case of the embodiment shown in FIG. 3b, the embodiment shown in FIG. 3c includes the tube 42 and the pin 44. The tube 42 and the pin 44 can be displaced relative to each other for gross adjustment of the first and second adjustment fingers 34, 36. The embodiment shown in FIG. 3c further includes a fine adjustment device 52. In the depicted embodiment of FIG. 3c, the fine adjustment device 52 includes a threaded rod 54, an adjustment nut 56, and a jam nut 58. The fine adjustment device 52 operatively connects to the pin 44. In the depicted embodiment of FIG. 3c, the pin 44 includes a fourth hole 60 which the threaded rod 54 engages.

FIG. 3d illustrates a variation of the embodiment shown in FIG. 3c. In FIG. 3d, the first and second adjustment fingers 34, 36 have both a gross and a fine adjustment. The first and second adjustment fingers 34, 36 each include a sleeve 62, depicted as a square tube, and an extensible member 63. The extensible member 63 slides within the sleeve 62. A locking mechanism 64 locks in place the extensible member 63 to hold it in a selectable position. In the embodiment depicted in FIG. 3d, the locking mechanism 64 is a screw-type locking mechanism. The depicted embodiment includes a nut 64a, a screw 64b, and a handle 64c. To use the locking mechanism 64, a user turns the handle 64c which turns the screw 64b. The screw 64b engages the extensible member 63. Friction between the screw 64b and the extensible member 63 prevents the extensible member 63 from moving.

The embodiment shown in FIG. 3d further includes a fine adjustment device 65. In the depicted embodiment of FIG. 3d, the fine adjustment device 65 includes an adjustment screw 65a and a jam nut 65b. The fine adjustment device 65 operatively connects to the extensible member 63. In the depicted embodiment of FIG. 3d, the extensible member 63 includes an opening 63a which the adjustment screw 65a engages.

FIG. 3e illustrates a variation of the embodiment shown in FIG. 3d. In the embodiment depicted in FIG. 3e the locking mechanism 64 is in the form of a toggle cam lock. The depicted locking mechanism includes a toggle cam mounting 64d, a cam 64e, and a toggle handle 64f. The cam 64e may be comprised of metal, plastic or resilient material. To use the locking mechanism 64, a user rotates the toggle handle 64f which rotates the cam 64e. The cam 64e frictionally engages the extensible member 63 through a slot (not shown) in the sleeve 62 thereby locking the extensible member 63 in place.

The locking mechanism 64 provides a device that quickly immobilizes or releases the extensible member 63. While a screw-type lock and a cam lock have been shown, those skilled in the art will understand that numerous devices that can quickly immobilizes or releases the extensible member 63.

FIG. 4 illustrates a perspective view of a universal adjustment device 200. The universal adjustment device 200 is adapted to operatively connect to an existing tree stand (shown in phantom). In the embodiment depicted in FIG. 4, the universal adjustment device 200 bolts onto the existing tree stand. The universal adjustment device 200 includes a first adjustment mechanism 210 and a second adjustment mechanism 212. Each adjustment mechanism includes a sleeve 214, an extensible member 216, and a locking mechanism 218. The extensible member 216 slides within the sleeve 214 and the locking mechanism 218 locks the extensible member 216 in place. In an optional embodiment, each adjustment mechanism also includes a fine adjustment device 220. A connector 222 operatively connects the first and second adjustment mechanisms 210, 212. In the depicted embodiment, the connector 222 is in the shape of a flat plate, but other shapes, a beam for example, may be used. The connector 222 provides rigidity to the universal adjustment device 200.

A mounting bracket 224 operatively connects the universal adjustment device 200 to the existing tree stand. In the depicted embodiment, the mounting bracket 224 has a U-shaped portion for receiving a cross-member of the existing tree stand. The U-shaped portion is formed by the combination of a top plate 226, a spacer 228, and a bottom plate 230. The mounting bracket 224 is operatively connected to the sleeves 214. In some embodiments, the mounting bracket 224 may also be operatively connected to the connector 222.

The universal adjustment device 200 may be connected to the existing tree stand through the use of fasteners or by welding. In the depicted embodiment, the universal adjustment device 200 is bolted to the existing tree stand through the use of a screw 232, lock washer 234, and a nut 236.

Figure 5A:
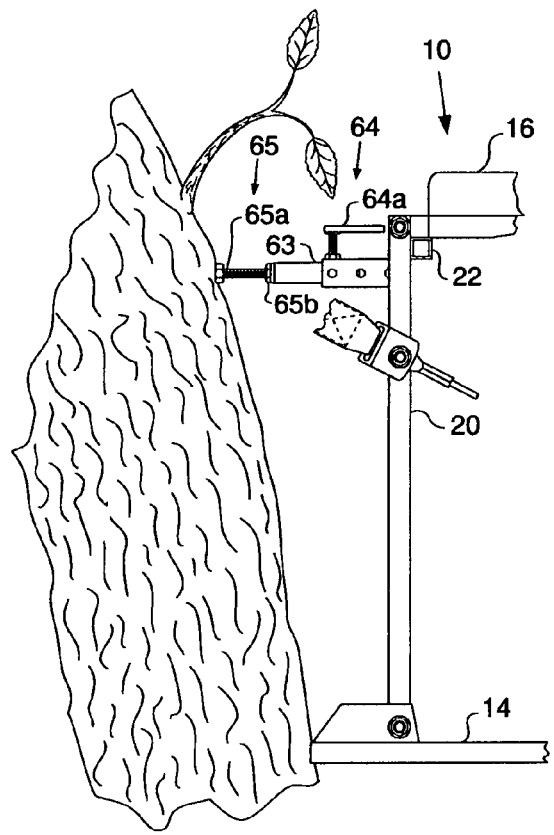
FIG. 5a is a side view of the tree stand in a third embodiment in use.
Figure 5B:
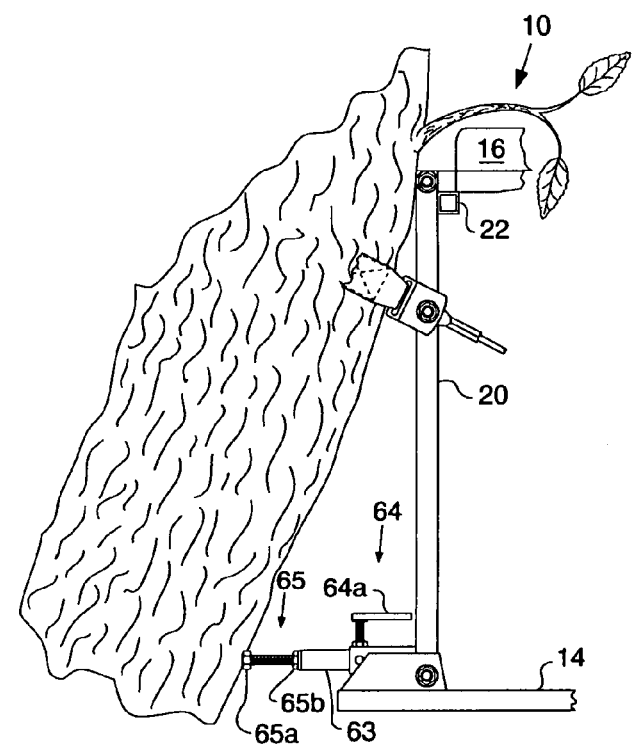
FIG. 5b is a side view of the tree stand in a forth embodiment in use.

FIG. 5 illustrates a side view of the tree stand 10 in use. The user places the tree stand 10 against the tree 100. The user loosens the locking mechanism 64. In the embodiment depicted in FIG. 5, the user loosens the locking mechanism 64 by turning the handle 64a. The user then slides out the extensible member 63 and locks it in place with the locking mechanism 64. In an optional step, the user may adjust the fine adjustment device 65. The user adjusts the fine adjustment device 65 by loosening the jam nut 65b and adjusting the adjustment screw 65a until the adjustment screw 65a touches the tree 100. The user then tightens the jam nut 65b to lock the adjustment screw 65a in place.

FIG. 6a illustrates a bottom 15 of the platform 14. A measuring device 70 operatively connects to the bottom 15. In the depicted embodiment, the measuring device is connected through the use of spring clamps 72. The measuring device 70 is used to measure the "lean" of the tree so that a user (not shown) can adjust the tree stand before placement in the tree.

FIG. 6b illustrates a detailed view of the measuring device 70. The measuring device 70 includes a handle 74, a support sleeve 76, a level 78, and a sliding member 80. The sliding member 80 includes indicia 82 that indicate units of measurement. The support sleeve 76 is operatively connected to the handle 74. The sliding member 80 slidably engages the support sleeve 76. The level 78 is operatively connected to the support sleeve 76.

Figure 6C:
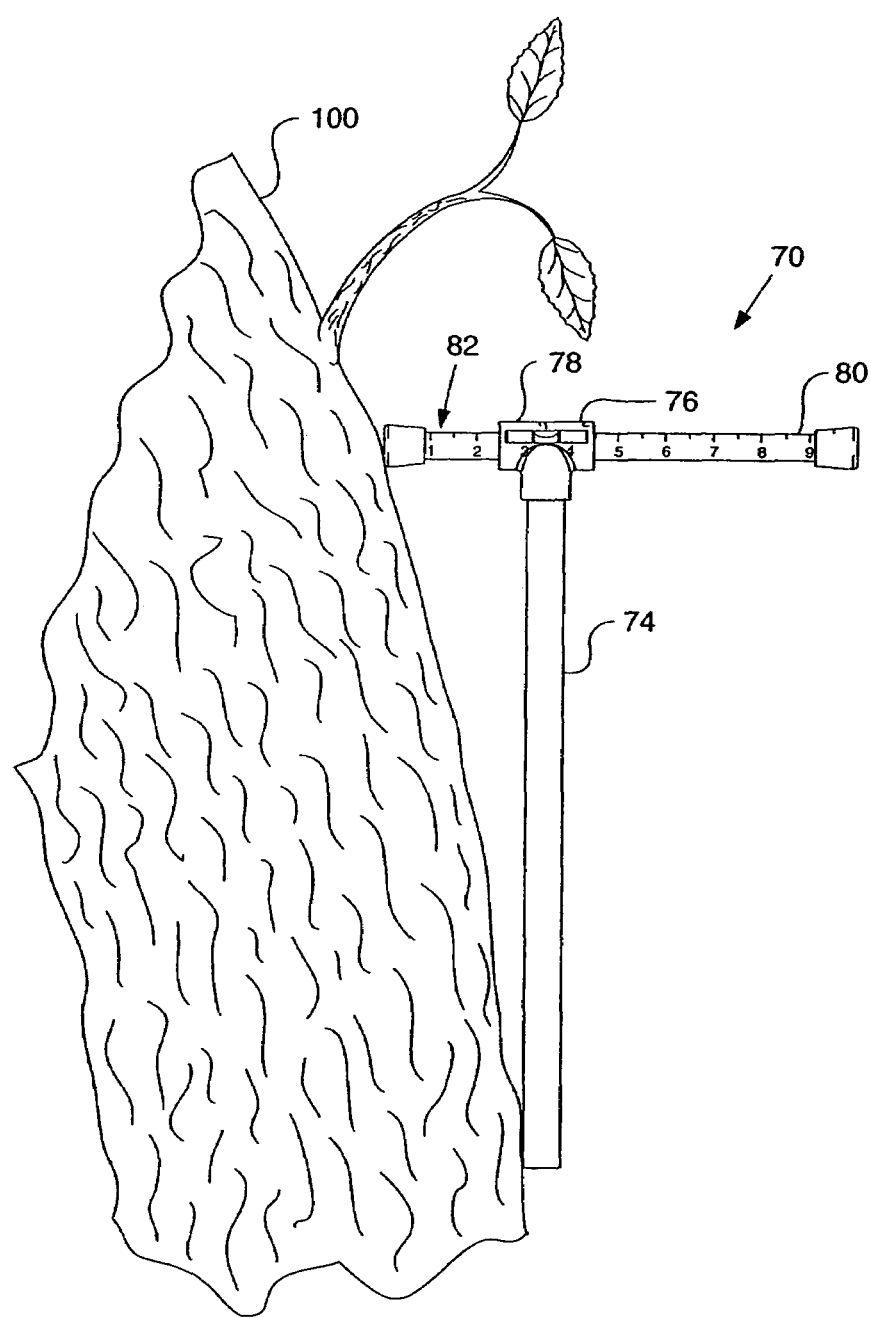
FIG. 6c is a side view of the measuring device in use.

A method of measuring tree "lean" for the purpose of adjusting the tree stand is shown in FIG. 6c. In a first step, the user places the handle 74 against a tree 100. The user adjusts the measuring device 70 until the level 78 indicates that the support sleeve 76 and the sliding member 80 are horizontal. The user extends the sliding member 80 until it touches the tree 100. The user notes the indicia 82 and adjusts the adjustment device 12. The adjustment device 12 is adjusted by either extending or retracting the adjustment fingers. In the embodiment depicted in FIG. 1, the adjustment fingers are extended or retracted through rotation.

A method of assembling a tree stand is also provided. The method comprises the steps of: providing a platform; operatively connecting a first support member to said platform; operatively connecting a second support member to said platform and spaced apart from said first support member; interconnecting said first support member and said second support member with at least one cross-member; and connecting an adjustment device to said at least one cross-member, said adjustment device having at least two adjustment fingers for engagement with the tree, and said at least two adjustment fingers being adjustable relative to one another. Optionally, the method may include the step of connecting at least one fine adjustment device to at least one of said at least two adjustment fingers In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the adjustment device may be connected to the supports or to the cross-members. Thus, the breadth and scope of the present invention should not be limited by any of the above-described exemplary embodiments, but should be defined only in accordance with the following claims appended hereto and their equivalents.

What is claimed is:

1. A universal and portable adjustment device for use with a tree stand such that the universal and portable adjustment device can adjust the angle of the tree stand relative to a tree, said universal and portable adjustment device comprising:

at least one adjustment mechanism having a sleeve, an extensible member being moveably extendable from said sleeve, and a locking mechanism adapted to engage said extensible member, each of said at least one adjustment mechanism having a first adjustment mechanism and a second adjustment mechanism, said first adjustment mechanism being movably extended to a first position and said second adjustment mechanism being moveably extended from said first adjustment mechanism to a second position, and a connector being a flat plate being connected to said first adjustment mechanism and said second adjustment mechanism; and a mounting bracket being positioned and releasably mounted to the tree stand based on characteristics of the tree, and said at least one adjustment mechanism being connected to said mounting bracket.

2. A universal and portable adjustment device for use with a tree stand such that the universal and portable adjustment device can adjust the angle of the tree stand relative to a tree, said universal and portable adjustment device comprising:

at least one adjustment mechanism having a sleeve, an extensible member being moveably extendable from said sleeve, and a locking mechanism adapted to engage said extensible member; and a mounting bracket having a U-shaped configuration, said U-shaped configuration comprises a top plate, a spacer, and a bottom plate and said mounting bracket being positioned and releasably mounted to the tree stand based on characteristics of the tree, and said at least one adjustment mechanism being connected to said mounting bracket.

* * * * *